United States Patent
Taranto

[19]

[11] Patent Number: 6,153,827

[45] Date of Patent: Nov. 28, 2000

[54] MOLDED CABLE ASSEMBLY

[75] Inventor: Ron Taranto, Rochester Hills, Mich.

[73] Assignee: Prestolock International, Ltd., Bloomfield Hills, Mich.

[21] Appl. No.: 09/112,881

[22] Filed: Jul. 9, 1998

[51] Int. Cl.$^7$ ....................................................... H02G 3/04
[52] U.S. Cl. ............................. 174/48; 174/60; 174/135; 439/473
[58] Field of Search ................................. 174/48, 49, 60, 174/92, 135, 68.1, 70 C, 91; 439/467, 473; 138/111, 112

[56] References Cited

U.S. PATENT DOCUMENTS

| | | | |
|---|---|---|---|
| 2,136,583 | 11/1938 | Corbett | 174/72 C |
| 2,227,528 | 1/1941 | Adler | 174/135 |
| 3,668,301 | 6/1972 | Faulconer | 174/88 R |
| 3,958,300 | 5/1976 | Tanaka | 174/68.1 |
| 4,449,015 | 5/1984 | Hotchkiss et al. | 174/138 F |
| 4,719,321 | 1/1988 | Kozel et al. | 174/135 |
| 4,831,215 | 5/1989 | Clark et al. | 174/92 |
| 4,927,984 | 5/1990 | Meislitzer et al. | 174/92 |
| 4,990,721 | 2/1991 | Sheehan | 174/65 R |
| 5,283,393 | 2/1994 | Guginsky | 174/102 R |

Primary Examiner—Kristine Kincaid
Assistant Examiner—Dhiru R Patel
Attorney, Agent, or Firm—Harness, Dickey & Pierce, P.L.C.

[57] ABSTRACT

The present relates to a molding process for, and structural configuration of, a cable assembly. More particularly, the present invention includes a cable assembly including a housing having a conduit and a clam-shell encasement integral with the conduit. The housing defines a passage that extends through the housing. The present invention also includes a method for manufacturing a cable assembly including the steps of forming a housing having a conduit and a clam-shell encasement integral with the conduit. The encasement is movable between an open position and a closed position and the housing defines a passage. The method further includes the steps of disposing a cable in the passage and placing the encasement into its closed position.

27 Claims, 3 Drawing Sheets

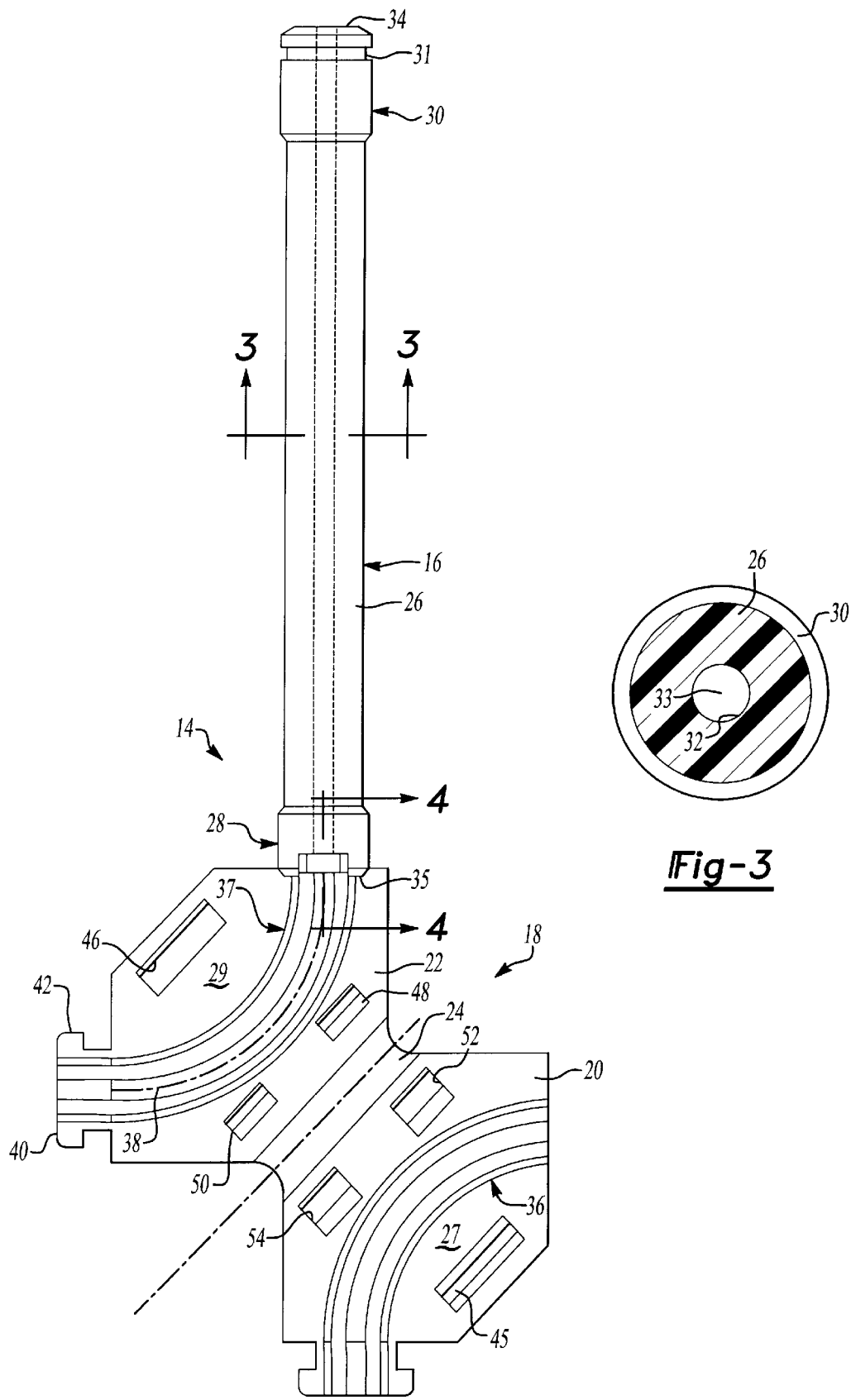

MOLDED CABLE ASSEMBLY

BACKGROUND OF THE INVENTION

1. Technical Field

The present invention relates to actuating mechanisms and, more particularly, to cable actuators.

2. Discussion

Cables are commonly used as force transferring mechanisms in the automotive industry. For example, handles and locks for doors, hoods, trunks, and glove boxes commonly include cables interconnecting the handle and latch mechanisms. In such assemblies, the length of the cable interconnecting the handle and latch and the cable housing are subject to tight tolerances for proper operation of the latch. These tolerances play an important role in the manufacturing process and often limit the manufacturing techniques available for a given mechanism.

As a general rule, the ease with which a part meets manufacturing tolerances depends upon the number of steps in the manufacturing process. Accordingly, the precision of a part is normally increased when the number of manufacturing steps is decreased. Also of particular importance to satisfying required tolerances is the precision of each manufacturing step. Accordingly, manufacturers of cable actuators are continually trying to decrease the complexity of the manufacturing process and increase the precision with which each manufacturing step is performed in order to increase the accuracy and repeatability of the part. While these attempts have resulted in noticeable improvements, the need for more precise manufacturing processes, and apparatuses that facilitate manufacturing ease and accuracy, remain.

SUMMARY OF THE INVENTION

Accordingly, a need exists for a manufacturing process and apparatus for a cable assembly that increases the accuracy and repeatability of the process and mechanism. To satisfy this need, the present invention relates to a molding process for, and structural configuration of, a cable assembly. More particularly, the present invention includes a cable assembly having a housing with a conduit and a clam-shell encasement integral with the conduit. The housing defines a passage that extends through the housing. The present invention also includes a method for manufacturing a cable assembly including the steps of forming a housing having a conduit and a clam-shell encasement integral with the conduit. The encasement is movable between an open position and a closed position and the housing defines a passage. The method further includes the steps of disposing a cable in the passage and placing the encasement into its closed position.

BRIEF DESCRIPTION OF THE DRAWINGS

Other objects and advantages of the invention will become apparent to one skilled in the art upon reading the following specification and subjoined claims and upon reference to the drawings in which:

FIG. 2 is a top plan view of the cable housing illustrated in FIG. 1 after a first molding step;

FIG. 3 is a sectional view taken along the line 3—3 illustrated in FIG. 2;

DETAILED DESCRIPTION

As illustrated in the appended drawings and described hereinafter, the present invention relates generally to a cable assembly 10 and a method of manufacturing the cable assembly. A detailed description of the structure and operation of the cable assembly is followed by a description of a method of manufacture. It should be appreciated that the following description is for illustrative purposes only and should not be construed to limit the scope of the invention defined by the appended claims.

Figure 1:
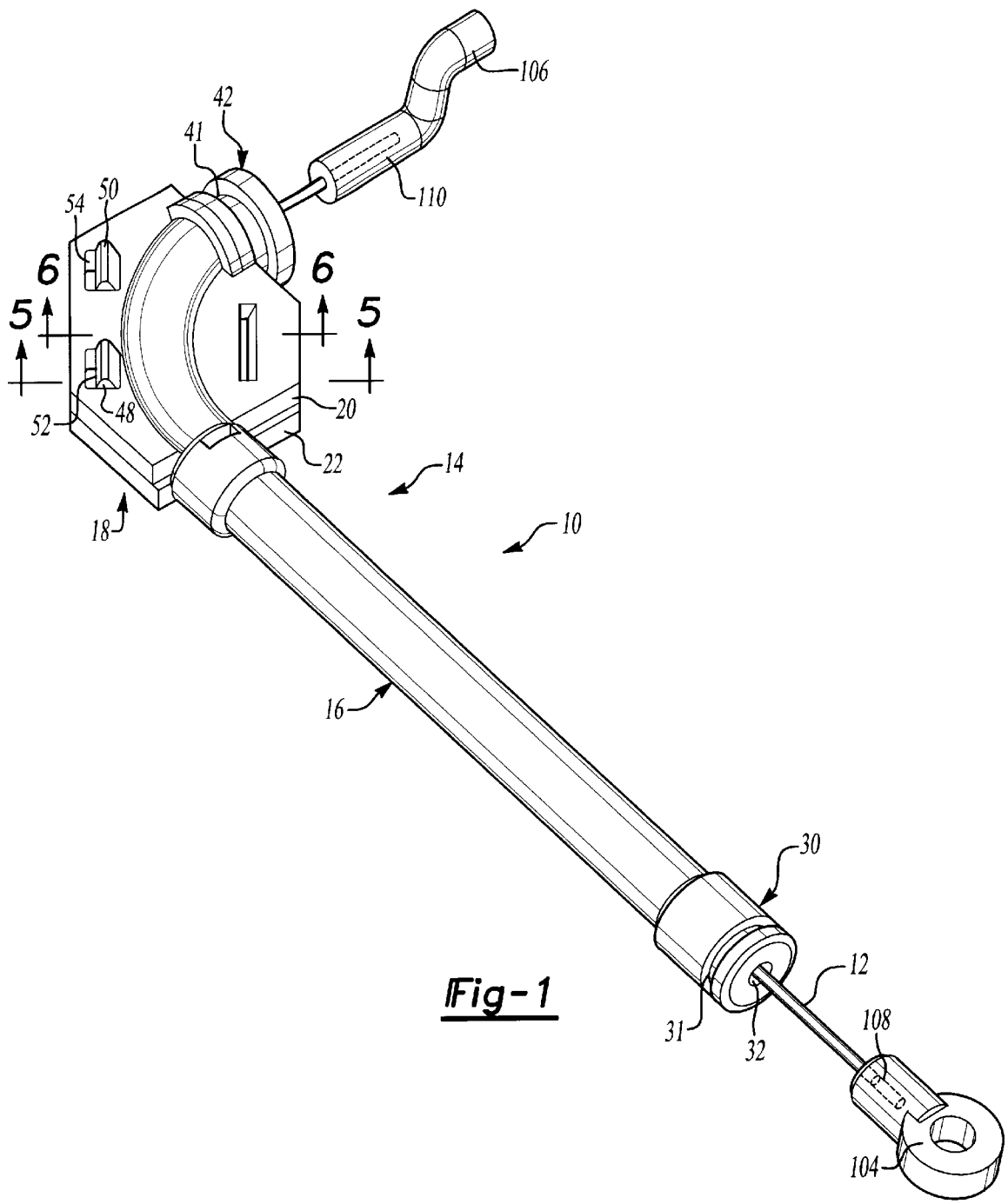
FIG. 1 is a perspective view of a cable assembly according to the present invention.

As best illustrated in FIG. 1, cable assembly 10 includes a cable 12 slidably disposed within a housing 14. Housing 14 includes a conduit 16 and a clam shell encasement 18 that includes first and second members 20 and 22 interconnected via a live hinge 24 (FIG. 2). As will be described in greater detail hereinafter and as best illustrated in FIG. 2, housing 14 is formed in a single molding step with conduit 16 formed integral with second member 22.

Conduit 16 is illustrated in FIGS. 2 and 3 as including a tube 26 interconnecting first and second collars 28 and 30, respectively. Tube 26 defines a bore 32 (FIG. 3) that is concentric about an axis 33 and that extends from and between terminal ends 34 and 35 of conduit 16. As illustrated in FIG. 1, cable 12 is disposed for sliding movement within bore 32. Those skilled in the art will appreciate that conduit 16 may vary in its specific configuration without departing from the scope of the present invention as defined by the appended claims.

Figure 4:
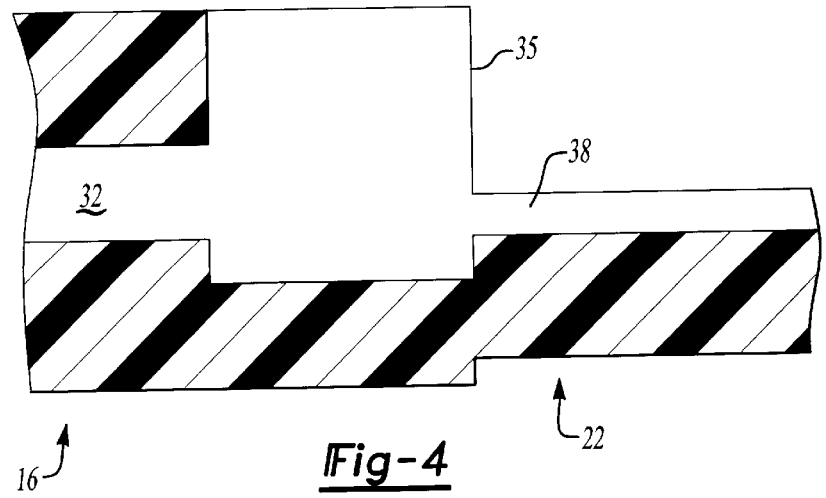
FIG. 4 is a sectional view taken along the line 4—4 illustrated in FIG. 2.

As best illustrated in FIG. 4, terminal end 35 of conduit 16 is integral with encasement 18 and, more particularly, with second member 22 thereof. First and second members 20 and 22 of encasement 18 each include plate-like bodies 27 and 29 (FIG. 2) having semi-circular relief sections 36 and 37, respectively, that extend between end face 35 of conduit 16 and an end face 40 of an encasement collar 42. As will be apparent from the following description, the semi-circular relief sections 36 and 37 cooperate to define a corridor 39 (FIGS. 5 and 6) for accommodating cable 12 as well as to properly position and interlock members 20 and 22 when the encasement 18 is in the closed position illustrated in FIGS. 1, 5, and 6. The bore 32 and corridor 39 communicate with one another at terminal end 35 of conduit 16 and together define a cable passage extending through housing 14 from collar 30 to collar 42. Those skilled in the art will also appreciate that collars 30 and 42 (FIG. 1) are configured to include recesses 31 and 41, respectively, to allow the coupling of housing 14 to the glove box structure in a manner known in the art.

Figure 5:
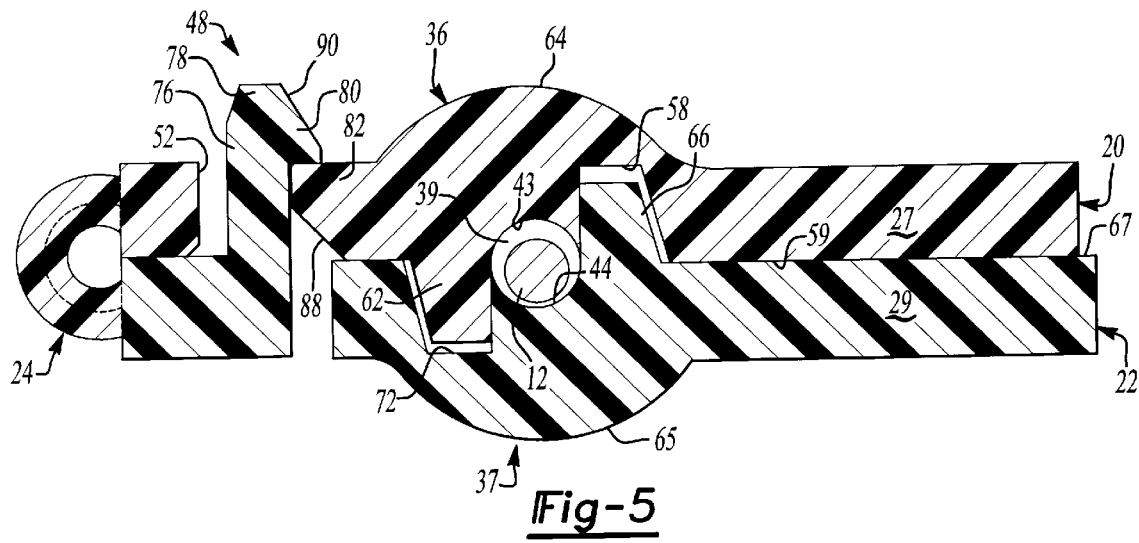
FIG. 5 is a sectional view taken along the line 5—5 illustrated in FIG. 1.
Figure 6:
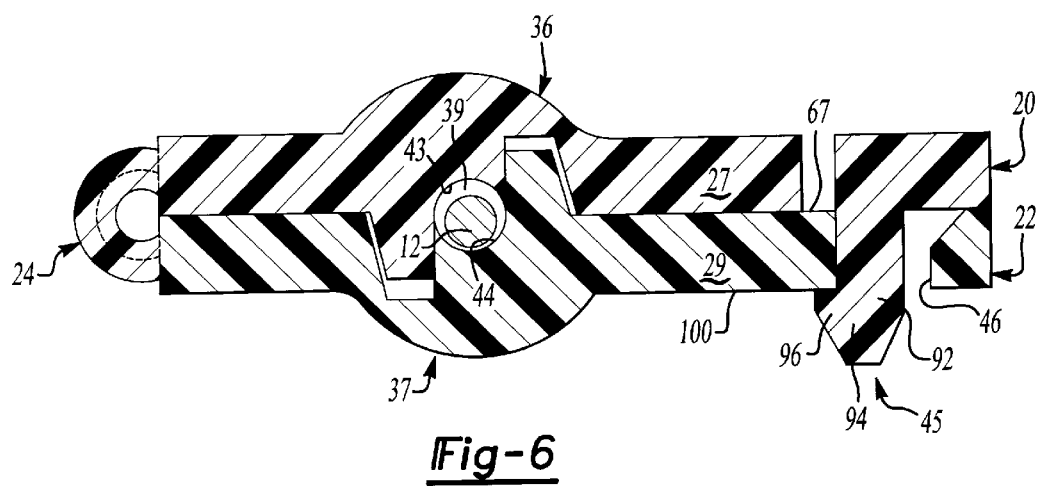
FIG. 6 is a sectional view taken along the line 6—6 illustrated in FIG. 1.

Relief sections 36 and 37 include semi-circular cable channels 43 and 44, respectively, that are mirror images of one another and are positionable in a cooperative configuration illustrated in FIGS. 1, 5, and 6 to define corridor 39 which includes a bend of approximately ninety degrees. First and second members 20 and 22 each also include a tongue segment and a groove segment separated by semi-circular channels 43 and 44. More particularly, with reference to FIG. 5, first member 20 includes a semi-circular channel 43, a tongue 62, and a groove 58 recessed from a planar surface 59 of body 27. Second member 22 is configured in a similar manner to first member 20 such that relief section 37 includes a tongue 66 extending from body 29, a semi-circular channel 44, and a groove 72.

As illustrated, the tongues and grooves are positioned on the first and second bodies 27 and 29, respectively, for interlocking engagement on both sides of the cooperating semi-circular channels 43 and 44. The interlocking engagement of tongue 66 with groove 58 and tongue 62 with groove 72 facilitates the proper positioning of the first and second members 20 and 22 relative to one another during the closing of the encasement 18, i.e. the folding over of members 20 and 22 about hinge 24, and interlocks the members to prevent relevant movement therebetween after intercoupling via the locking mechanisms described below. In the respective relief sections 36 and 37 of first and second members 20 and 22 a mounded bulge such as that indicated by reference numerals 64 and 65, respectively, is provided for ease of manufacture and to increase the structural integrity of the members in this area.

Members 20 and 22 also cooperate to define a locking mechanism that, in the preferred embodiment, includes a central locking tab 45 (FIG. 6) extending from first body 27 and a central aperture 46 formed in second body 29. The preferred locking mechanism further includes a pair of off-set locking tabs 48 and 50 formed integral with second body 29 and cooperating off-set apertures 52 and 54 formed in first body 27. The respective locking tabs and apertures are generally illustrated in FIGS. 1 and 2. Those skilled in the art will appreciate that the encasement 18 may be selectively moved from the open configuration illustrated in FIG. 2 to its closed position illustrated in FIG. 1 whereupon the locking mechanism prevents inadvertent opening of the encasement 18.

The configuration and interaction of tab 48 and aperture 52 is more clearly illustrated in FIG. 5. Specifically, off-set locking tab 48 includes a neck 76 that, when the encasement is in its closed position, extends through off-set aperture 52 in body 27. Tab 48 also includes a head 78 having a barb 80 defining a locking face 82. Neck 76 is of a sufficient length to ensure that head 78 extends through off-set aperture 52 and that locking face 82 of barb 80 lockingly engages a surface 84 of first body 27 in the manner illustrated. Those skilled in the art will appreciate that second locking tab 50 and off-set aperture 54 are substantially identical to the off-set tab 48 and aperture 52 illustrated in FIG. 5. First member 20 also includes an inclined face 88 that partially defines off-set aperture 52. An inclined face 90 on head 78 is configured to engage inclined face 88 to facilitate insertion of tab 48 in a manner generally recognized in the art. The locking engagement of the off-set tabs 48 and 50 with apertures 52 and 54 again facilitates obtaining and retaining proper alignment between first and second members 20 and 22.

The configuration of central locking tab 45 and central aperture 46, which are substantially similar to off-set tabs 48 and 50 and off-set apertures 52 and 54 both in function and structure, will now be described with reference to FIG. 6. Central locking tab 45 includes a neck 92 and a head 94 integral with first member 20. Head 94 includes a barb 96 defining an engagement surface 98 configured to lockingly engage a second planar surface 100 of second body 29. Central aperture 46 extends from and between first and second planar surfaces 67 and 100 of second body 29 and accommodates central locking tab 45 as shown. The locking mechanism defined by tabs 45, 48 and 50, the cooperating apertures, and the respective tongue and groove interlocking engagements within relief sections 36 and 37 securely intercouple first and second members 20 and 22 in the relative positions shown. Those skilled in the art will appreciate that a variety of alternative locking configurations may be used with the present invention without departing from the proper scope thereof as defined by the appended claims.

Returning now to FIG. 1, cable assembly 10 also includes first and second end adapter fittings 104 and 106 molded about first and second ends 108 and 110 of cable 12. In the illustrated embodiment, first fitting 104 is an eyelet connector whereas second fitting 106 is a stepped cylindrical member configured in a manner known in the art for actuating a glove box. More particularly, first fitting 104 may be coupled to a glove box handle 112 and the second fitting 106 may be coupled to a glove box latch 114 such that actuation of the handle causes axial displacement of the cable 12 within the housing 14 to operate the latch 114. Those skilled in the art will appreciate that a variety of fitting configurations may be used with the present invention without departing from the scope thereof as defined by the appended claims.

The manufacturing steps contemplated for the present invention will now be described with reference to FIGS. 1 and 2. One of the advantages of the present invention is that the manufacturing of cable assembly 10 is performed in a two-step molding process. Previous manufacturing approaches required additional manufacturing steps and the intercoupling of molded components. The multiple prior art steps increase the geometric variability of the assemblies and make manufacturing the cable assembly within required tolerances more difficult. By reducing the number of manufacturing steps and using processes that can be performed precisely, the present invention increases the accuracy and repeatability of the resulting assembly.

The manufacture of cable assembly 10 includes the step of molding housing 14. This first molding includes a single step of simultaneously molding the clam shell encasement 18 and conduit 16. The molded housing 14 is illustrated in FIG. 2. The clam shell configuration of encasement 18 provides access to semi-circular channels 43 and 44 thereby allowing placement of cable 12 within the conduit bore 32 (FIG. 3). Prior to or after insertion within bore 32, cable 12 is cut to a predetermined length required by the specific application of cable assembly 10.

By forming the encasement 18 and conduit 16 in a single step, the present invention eliminates molding and attachment steps previously used in the prior art to interconnect these separately molded members. More particularly, prior art manufacturing techniques include separately molding the conduit 16 and encasement 18 wherein the encasement defined a closed tube having a ninety degree (90°) bend. This closed tube is then attached to the conduit 16 such as proximate to first collar 28. Those skilled in the art will appreciate that the two-step prior art process for forming housing 14, including the connection of the encasement to the conduit, creates inaccuracies and/or stack-on tolerances in the assembly process and therefore decreases the repeatability of manufacture. One of the advantages of this tighter tolerance is less variability in dimension between 41 and 31 which are used for mounting purposes.

Following the molding and cable cutting steps discussed above, adapter fittings 104 and 106 are molded onto first and second ends 108 and 110 of cable 12 in the second of the two-step molding process. In this step, the positioning of the adapter fittings relative to one another is determined by the mold spacing. As a result, the end adaptor spacing along cable 12 is both accurate and repeatable. Either before or after the molding of adapter fittings 104 and 106 about cable 12, the clam shell encasement 18 may be closed. The manufacturing of cable assembly 10 is thereby complete and the cable assembly 10 illustrated in FIG. 1 is more accurate and repeatable than cable assemblies manufactured by known methods.

From the above description, those skilled in the art will appreciate that the clam shell configuration of encasement 18 allows the housing 14 to be formed in a single molding step thereby eliminating inaccuracies present in the prior art. Moreover, the configuration of encasement 18 further allows the adapter fittings 104 and 106 to be molded over first and second ends 108 and 110, respectively, of cable 12 in a single molding step thereby ensuring the relative placement of the adapter fittings along cable 12. These advantages yield a more accurate and repeatable cable assembly over prior art manufacturing techniques and cable assembly configurations.

Various other advantages and modifications will become apparent to one skilled in the art after having the benefit of studying the teachings of the specification, the drawings, and the following claims.

What is claimed is:

1. A cable assembly operatively interconnecting a handle and a latch, comprising:
    a housing having a conduit with a bore and a clam-shell encasement with a corridor, said clam-shell encasement being integral with said conduit, said bore communicating with said corridor to define a cable passage extending through said housing, said corridor having a bend; and
    a cable disposed for sliding movement within the cable passage and said cable having first and second ends extending from the housing.

2. The cable assembly of claim 1 wherein said claim-shell encasement includes a first member, a second member, and a hinge pivotally coupling said first and second members for movement between an open position and a closed position.

3. The cable assembly of claim 2 wherein said first member includes a first relief section having a first channel and said second member includes a second relief section having a second channel, said first and second channels cooperate to define said corridor extending through said clam-shell encasement when said first and second members are in said closed position.

4. The cable assembly of claim 3 wherein said first relief section includes a first tongue and a first groove, wherein said second relief section includes a second tongue and a second groove, and wherein said first tongue is in interlocking engagement with said second groove and said second tongue is in interlocking engagement with said first groove when said first and second members are in said closed position.

5. The cable assembly of claim 4 wherein said first channel is disposed between said first tongue and said first groove and wherein said second channel is disposed between said second tongue and said second groove.

6. The cable assembly of claim 2 further including coupling means for coupling said first member to said second member when said first and second members are in said closed position.

7. The cable assembly of claim 6 wherein said coupling means includes a first locking tab integral with one of said first and second members and wherein the other of said first and second members includes a first aperture, said first locking tab being disposed in said first aperture and engaging the other of said first and second members when said first and second members are in said closed position.

8. The cable assembly of claim 7 wherein said first locking tab is integral with said first member and said second member includes said first aperture.

9. The cable assembly of claim 8 wherein said coupling means further includes a second locking tab integral with said second member and said first member includes a second aperture, said second locking tab being disposed in said second aperture to lockingly engage said first member when said first and second members are in said closed position.

10. The cable assembly of claim 9 wherein said coupling means further includes a third locking tab integral with said second member and said first member includes a third aperture, said third locking tab being disposed in said third aperture to lockingly engage said first member when said first and second members are in said closed position.

11. The cable assembly of claim 3 wherein said conduit includes said bore extending from a first end of said conduit to a second end of said conduit, said bore communicating with said second channel, said bore and corridor defining said passage when said clam shell encasement is in said closed position.

12. The cable assembly of claim 1 further including:
    first and second end adapters coupled to said first and second ends of said cable, said first end adapter adapted to be coupled to the handle and said second end adapter adapted to coupled to the latch whereby said cable operatively interconnects the handle and the latch such that movement of the handle axially displaces the cable within said cable passage to move the latch.

13. A cable assembly comprising:
    a housing having a conduit and a clam-shell encasement integral with said conduit, said housing defining a cable passage extending therethrough, said clam-shell encasement includes a first member, a second member, and a hinge pivotally coupling said first and second members for movement between an open position and a closed position, said first member includes a first relief section having a first channel and said second member includes a second relief section having a second channel, said first and second channels cooperate to define a corridor extending through said clam-shell encasement when said first and second members are in said closed position, said first relief section includes a first tongue and a first groove, said second relief section includes a second tongue and a second groove, and wherein said first tongue is in interlocking engagement with said second groove and said second tongue is in interlocking engagement with said first groove when said first and second members are in said closed position.

14. The cable assembly of claim 13 wherein said first channel is disposed between said first tongue and said first groove and wherein said second channel is disposed between said second tongue and said second groove.

15. The cable assembly of claim 13 further including coupling means for coupling said first member to said second member when said first and second members are in said closed position.

16. The cable assembly of claim 13 wherein said conduit includes a bore extending from a first end of said conduit to a second end of said conduit, said bore communicating with said second channel, said bore and corridor defining said passage when said clam shell encasement is in said closed position.

17. The cable assembly of claim 13 further including:
    a cable slidably disposed within said passage, said cable having first and second ends extending from said housing; and
    first and second end adapters coupled to said first and second ends of said cable.

18. A latch assembly for a glove box comprising:

a latch;

a handle; and a cable assembly operatively connecting said handle to said latch, said cable assembly including a housing having a conduit integral with a clam-shell encasement, said conduit having a bore, said clam-shell encasement having a corridor, said corridor having a bend, said corridor communicating with said bore to define a cable passage extending through said housing, said cable assembly further including a cable disposed in said cable passage for axial movement therewithin, said cable having a first end coupled to said latch and a second end coupled to said handle.

19. The latch assembly of claim 18 wherein said bend is approximately ninety degrees.

20. The latch assembly of claim 19 wherein said bore extends from a first end of said conduit to a second end of said conduit, said bore being axially aligned with said second channel, said bore and corridor defining said cable passage when said clam shell encasement is in said closed position.

21. The latch assembly of claim 18 wherein said clam-shell encasement includes a first member, a second member, and a hinge pivotally coupling said first and second members for movement between an open position and a closed position.

22. The latch assembly of claim 21 wherein said first member includes a first relief section having a first channel and said second member includes a second relief section having a second channel, said first and second channels cooperate to define said corridor when said first and second members are in said closed position.

23. The latch assembly of claim 22 wherein said bore extends through said conduit and is axially aligned with said second channel.

24. The latch assembly of claim 22 wherein said first relief section includes a first tongue and a first groove, wherein said second relief section includes a second tongue and a second groove, and wherein said first tongue is in interlocking engagement with said second groove and said second tongue is in interlocking engagement with said first groove when said first and second members are in said closed position.

25. The latch assembly of claim 24 wherein said first channel is disposed between said first tongue and said first groove and wherein said second channel is disposed between said second tongue and said second groove.

26. The latch assembly of claim 25 wherein said coupling means includes a first locking tab integral with one of said first and second members and wherein the other of said first and second members includes a first aperture, said first locking tab being disposed in said first aperture and engaging the other of said first and second members when said first and second members are in said closed position.

27. The latch assembly of claim 18 further including first and second end adapters coupled to said first and second ends of said cable.

* * * * *